March 18, 1969    C. E. PFUND    3,434,107
AUTOMOBILE LIGHT SIGNALLING DEVICE
Filed Oct. 10, 1966
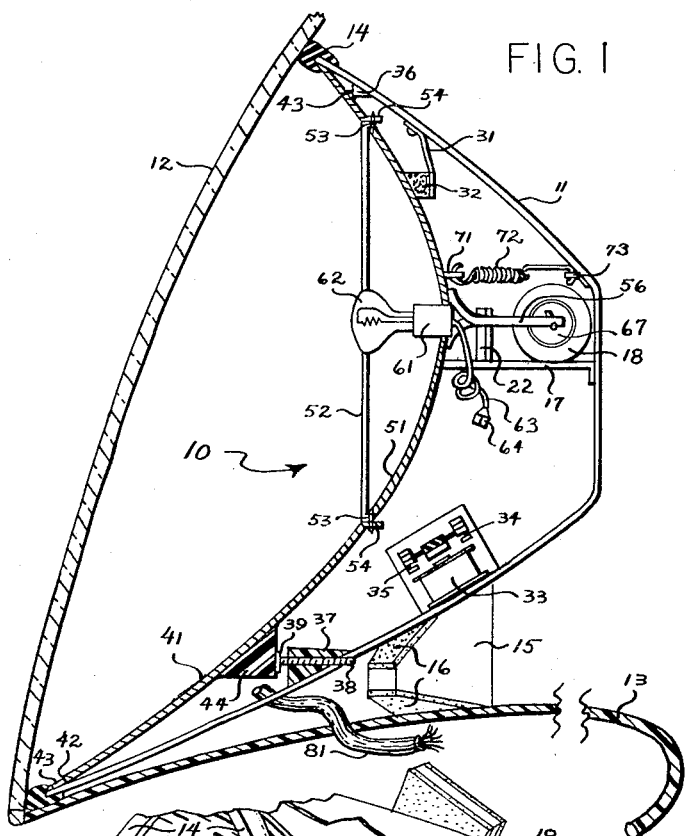
FIG. 1
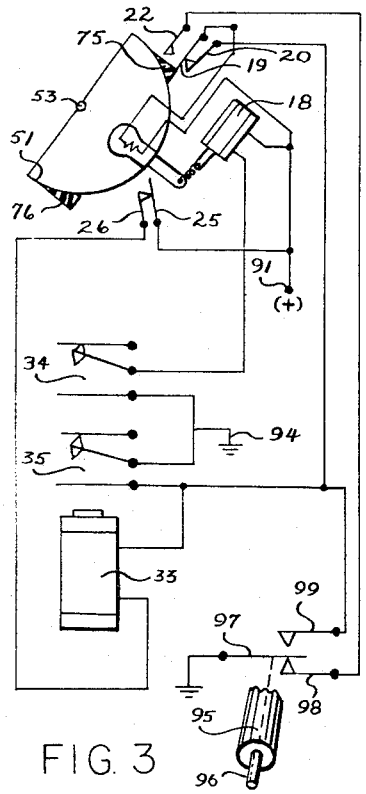
FIG. 3
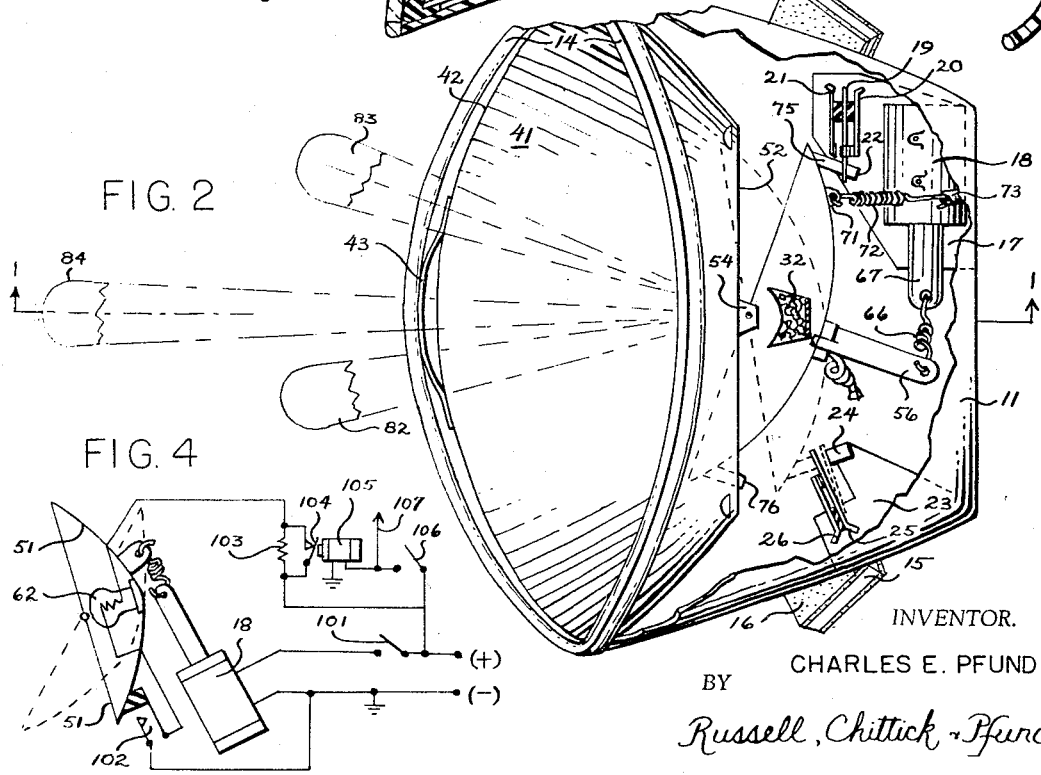
FIG. 2
FIG. 4
INVENTOR.
CHARLES E. PFUND
BY
Russell, Chittick & Pfund

United States Patent Office 3,434,107
Patented Mar. 18, 1969

3,434,107
AUTOMOBILE LIGHT SIGNALLING DEVICE
Charles E. Pfund, 16 Balcarres Road,
Newton, Mass. 02165
Filed Oct. 10, 1966, Ser. No. 585,386
U.S. Cl. 340—74     4 Claims
Int. Cl. B60q 1/26, 1/00; F21v 7/00

ABSTRACT OF THE DISCLOSURE

An automobile signal light provides a transient signal cycle which sweeps a narrow light beam through a small angle during which the light is energized and after which the light is extinguished. An electromechanical actuator responsive to a driver operated switch is used to rotate a focused beam lamp through a small horizontal angle and to control energization of the lamp. The lamp is energized during the rotation and deenergized at the end of the cycle automatically to prevent continuous energized oscillation of the lamp.

---

This invention relates generally to light signalling devices and is in part a continuation of my copending application Ser. No. 339,019, filed Jan. 20, 1964, now Patent No. 3,278,895.

Prior art signalling systems for automobiles have been proposed which require a transmitter and receiver in the automobile so that warning signals can be transmitted from one automobile and received in the adjacent automobile. These systems have the obvious disadvantage of requiring that all cars be equipped with a full system in order for them to be effective. It has also been proposed to use light signalling such as the flashing of the high beams of automobile headlights and related systems but such equipments are generally not universally useful since the high intensities required for daylight effectiveness cannot be tolerated. In my copending application a system for transmitting a broad light beam in which the flash is of extremely short duration is provided thereby providing adequate coverage of the area of traffic which it is desired to signal and by virtue of the short duration of the flash avoiding any objectionable blinding effect. Such equipments can employ intensities that make the signalling system useful under a substantial majority of driving conditions including daylight except for the brightest sunlight conditions. The present invention provides similar capabilities with substantially less expensive apparatus by providing an incandescent or other point illumination source which can be selectively actuated to be energized only for a brief interval and focusing the light into an extremely sharp and narrow beam by means of a suitable reflector. This beam is automatically scanned through the desired azimuth angle in order that the requirement for coverage of the traffic area of interest can be met and also to satisfy the requirement that as to any particular driver in the traffic adjacent an automobile the duration of the light flash is effectively so short that no blinding effect is produced. By rotation of a narrow beam both of these objectives are accomplished in a relatively simple manner as hereinafter described.

Accordingly it is a primary object of the present invention to provide an economical and effective transient cycle light signalling device selectively operable by the driver of an automobile to signal a wide angular traffic area ahead of the vehicle with a high intensity beam capable of substantial detection under most operating ambient light conditions while reducing the blinding effect of the light to a minimum by virtue of the short duration that the sweeping beam has at any given location due to the rotation of the beam while energized and the deenergization of the beam at the end of the cycle.

Further objects and advantages of the invention will be apparent from the following detailed description and include a beam enhancement feature for the direct ahead beam direction which is achieved by virtue of an improved reflector arrangement comprising fixed and movable reflector portions which are parts of the same parabolic reflector. The invention also provides an improved arrangement for mounting light signalling devices in an automobile against the inside of the windshield thereby permitting such devices to be installed easily and simply in existing automobiles. When mounted against the inner surface of sloping windshields the configuration permits the parabolic reflector to be extended to fit the glass surface thereby increasing the beam forming aperture.

Referring now to the drawings:

FIG. 1 is a vertical sectional view taken along the line 1—1 of FIG. 2 showing features of the device as it is mounted against the sloping inner surface of the windshield of an automobile;

FIG. 2 is a top plan view of the device of FIG. 1 shown without the automobile windshield;

FIG. 3 is a wiring diagram showing one fully automatic operating circuit suitable for the device of the invention; and FIG. 4 is a simplified wiring diagram suitable for semi-automatic operation of the device of the invention.

Referring now to FIGS. 1 and 2 the preferred form of the invention comprises a housing 11 which is generally cup-shaped and supports therein a paraboloid assembly generally indicated at 10. The front portions of units 10 and 11 are truncated asymmetrically to fit against the inner surface of a sloping glass windshield 12 of an automobile. The housing 11 is supported on the top surface 13 of the dashboard of the automobile. To provide a shock mount, a dirt seal and a generally resilient and form fitting edge for the housing 11 a soft rubber gasket 14 is arranged to fit around the aperture edge of the housing 11. The assembled units 10 and 11 are mounted with the gasket 14 pressed against the inner surface of the windshield 12 and retained in any suitable fashion. One simple form of mounting is indicated in FIGS. 1 and 2 comprising a pair of wedge shaped blocks 15. On opposed surfaces of blocks 15 are sheets 16 of foamed flexible polyurethane with pressure sensitive adhesive surfaces. With such adhesive surface blocks the housing 11 can be mounted by pressing gasket 14 against the windshield 12 and wedging the blocks 15 in place as indicated with the foam layers 16 providing a resilient and adhesive force to hold the unit in place. Other mounting arrangements can be used and the invention can also be adapted for installation as factory furnished equipment, if desired.

The housing 11 supports an internal shelf 17 on which is mounted a solenoid actuator 18 and a single pole double throw set of contacts 19, 20, 21. The transfer contact 19 has a closed position against contact 20 when contact 19 is against a non-conductive stop 22 and a normally open contact 21 which is contacted when transfer contact 19 is not held against the stop 22.

A second horizontal shelf 23 within housing 11 supports a non-conductive stop 24 adjacent a set of normally closed contacts 25, 26. When contact 25 is moved against the stop 24 the contacts 25, 26 are open.

The housing 11 also supports on a depending leaf spring 31 a felt pad 32 which has an arcuate surface portion. Within the housing 11 is a relay 33 having double pole normally open contacts 34 and 35.

For mounting the reflector assembly 10, the housing 11 has molded therein two projecting stops 36 spaced across the top edge of the inner surface of the housing 11 and a stop 37 having threaded therein a screw 38 which is accessible through a hole in the housing for adjustment from the back of the unit. The screw 38 terminates in a flat head 39 to apply adjusting movement to the reflector assembly 10 as hereinafter described.

The reflector assembly 10 preferably comprises a parabolic mirror surface 41 mounted inside the housing 11 and retained in position by the gasket 14. The parabolic surface 41 has a lower front edge 42 spaced from the gasket 42 by a leaf spring 43 which urges the assembly 10 away from the inside flange of the gasket 14. The upper convex surface of the reflector 41 has a pair of flat projections 43 which abut the projections 36 on the inner surface of the housing 11. A projection 44 provides a bearing surface for the flat head 39 on the screw 38 thereby providing an elevation adjustment for the reflector surface 31 as the screw 38 is rotated to move the front edge 42 of the reflector 41 against the leaf spring 43.

The reflector assembly 10 has at the apex of the paraboloid a movable section 51 which is preferably a continuation of the parabolic surface 41 but spaced therefrom a sufficient distance to be rotatable within the aperture formed by terminal edge 52 of the fixed portion 41. This movable paraboloid 51 is rotatable in azimuth by means of pins 53 inserted in bearing extension tabs 54 that are fixed to the terminal edge 52 of the fixed paraboloid 41. In its assembled position the fixed paraboloid 41 locates the movable paraboloid 51 in rubbing contact with the felt pad 32 to damp the oscillatory motion of the assembly when it is rotated.

The rotatable paraboloid 51 has mounted on its axis a socket 61 on which is mounted an incandescent lamp 62 having a filament at the focus of the paraboloid 51. The socket 61 has extending therefrom a lead 63 by which connections to energize the filament of the lamp 62 can be made as, for example, by means of a suitable connector 64.

For rotating the paraboloid 51 about the vertical axis formed by pins 53 a horizontal arm 56 extends along the line of the axis of the paraboloid 51. The arm 56 is connected by means of a spring 66 to the actuator plunger 67 of the solenoid 18. The rear surface of the reflector 51 also has a tab 71 by which a spring 72 can connect to a tab 73 on the frame 11 thereby urging the reflector 51 into a normal position as shown in FIG. 2. In this position a dielectric post 75 mounted on the reflector 51 presses the contact 19 against the stop 21 and in contact with contact 20. A corresponding dielectric post 76 is provided on the diametrically opposite side of the rear surface of reflector 51 for operating contact 25.

With the arrangement shown it can be seen that the unit can be assembled by placing the reflector assembly 10 into the housing unit 11 with the edge retained by gasket 14. The upper stops 43 are pressed against the housing stops 36 and with the lower stop 44 is positioned by means of the screw 38. Thus the preferred horizontal elevation position for the beam focused from lamp 62 by the reflector surfaces 41 and 51 is obtained. The mechanical connections comprise affixing the springs 72 and 66 and making electrical connections for the lamp by means of the connector 64 in accordance with the desired circuit arrangements. Suitable additional electrical connections to the unit can be made by means of a cable having multiple conductors 81 as required by the circuit used. After the device is physically installed on the dashboard and directed horizontally through the windshield 12 the conductors of cable 81 can be connected to the required points in the automobile electrical system as hereinafter described.

The mechanical operation of the device will now be described. The normal at rest position for the reflector section 51 is shown in FIG. 2 as determined by the tension in spring 72 and the position of stop 22 which is effective to determine one extreme rotated position for the reflector 51. When the actuator 18 is energized the plunger 67 is drawn into the actuator thereby rotating the reflector 51 to its alternate position indicated in FIG. 2 with the motion being moderated by the initial extension of spring 66 and terminated when the post 76 pushes contact 25 against stop 24. As hereinafter described the opening of contacts 25 and 26 is utilized in the circuit embodiment of FIG. 3 to deenergize the solenoid 18 thereby permitting reflector 51 to return to its at rest position. In this fashion with the lamp 62 energized during the rotation of the reflector 51 a sweeping beam between predetermined angles as indicated at 82 and 83 is obtained.

It will be noted that the angle 83 is greater than the angle 82 from the central axial position 84 of the beam and this is a preferable arrangement to avoid directing the beam to the oncoming traffic at close range in right hand driving convention countries. It will also be noted in FIG. 2 that the beam 84 in the straight ahead direction is indicated as having greater magnitude than the beam at 82 or 83. The reason this effect is obtained is because the fixed reflector 41 is preferably actually an extension of the paraboloid represented by the surface of movable reflector 51. For the central axial position of the reflector 51 the entire aperture represented by both movable portion 51 and fixed portion 41 provides the total mirror paraboloid for forming the beam and produces a greater intensity beam than when the smaller effective aperture 51 is the only effective paraboloid surface. Obviously if the surface 41 is not an extension of paraboloid 51 an enhanced aperture will not be as pronounced. In either event the extension 41 should be constructed of substantially opaque material so as to confine the light beam from the reflector 51 to prevent reflection within the automobile from the windshield 12.

Referring now to FIG. 3 a fully automatic circuit operation for the device of FIGS. 1, 2 will be described. The movable reflector portion 51 is indicated pivoted at 53 and with the extensions 75 and 76 provided to operate the respective contacts 19 and 25. The circuit connections to energize the device from the automobile battery include a connection from a battery terminal 91 through the winding of solenoid 18 to normally open contact 34 of relay 33. The battery terminal 91 is also connected to energize lamp 62 through normally closed contacts 19 and 20 and the normally open contact 35 of relay 33. The battery terminal 91 is also connected through normally enclosed contacts 25 and 26 to one terminal of the relay winding 33. The other terminal of relay winding 33 is connected to the contact 35. The open terminals of the contacts 34 and 35 are both connected to the other terminal of the battery indicated at ground 94. The operating switch for the device of FIG. 3 can conveniently be mounted on the turn signal lever 95 located adjacent to the steering wheel of the automobile with an actuator button 96 for operating a ground transfer contact 97 between a normally closed position on contact 98 and a normally open contact 99. The contact 98 is connected to the contact 22 and the contact 99 is connected to one terminal contact 35 to contact 20. A spring return type switch is preferred.

The operation of the circuit of FIG. 3 is as follows. Whenever a signal sequence is to be initiated by the operator of the vehicle he extends his finger beneath the steering wheel and depresses the button 96 to move the contact 97 from contact 98 over to contact 99. The circuit from ground contact 97 to contact 99 energizes the relay coil 33 through closed contacts 25 and 26. Energizing relay 33 moves both sets of contacts 34 and 35 to the closed position and contact 35 seals the circuit to ground 94 thereby maintaining the relay 33 energized. Grounding contact 99 by means of movable contact 97 also energizes the lamp 62 through normally closed contacts 19 and 20 so that the lamp 62 is immediately illuminated. As soon as the relay 33 has been energized the closure of contacts 34 energizes the solenoid 18 so that the lamp reflector 51 starts to rotate in a counter clockwise direction thereby lifting the projection 75 from contact 19 and permitting contact 19 to transfer the contact 22. Breaking the contacts 19 and 20 would deenergize the lamp 62 if the actuator button 96 were held down and since this is not the desired effect the operator must release contact 96 in order to maintain the lamp 62 energized by the circuit through the now closed contacts 19 and 22. This circuit arrangement prevents the operator from projecting a continuous light beam with the solenoid 18 continuously energized in a fixed direction with stop 76 against contact 25. As shown, the release of the button 96 is necessary to return contact 97 to contact 98 in order to maintain the lamp 62 energized.

Upon the completion of counter clockwise rotation of reflector 51, the stop 76 opens switch contacts 25 and 26 to deenergize the relay coil 33 thereby permitting contacts 34 and 35 to open. Opening contact 35 deenergizes the solenoid 18 permitting the reflector 51 to rotate in a clockwise direction under the influence of spring 72. The lamp 62 remains energized until the full clockwise rotation has been completed and stop 75 has transferred contact 19 back into contact with contact 20 which ends the operating cycle of the device. The cycle is completed by a single depression and release of the actuator button 96 and is incapable of being operated with a continuously energized light beam in a fixed direction.

A simplified semi-automatic circuit is shown in FIG. 4 which eliminates the need for relay 33. In the circuit of FIG. 4 the actuator button 96 operates a switch 101 to close the energizing circuit to solenoid 18 and start the rotation of reflector 51. It will be noted in FIG. 4 that the normal at rest position for reflector 51 is opposite that previously described and this is preferred although either rotation sequence may be used. When solenoid 18 is energized the initial rotation of reflector 51 closes a set of normally open contacts 102 and when the contacts 102 are closed the lamp 62 is energized from the battery circuit of the automobile. Thus as long as the switch 101 remains closed the solenoid 18 is energized and the lamp 62 is energized with the light beam directed to the right as indicated in the alternate position of FIG. 4. The beam will thus not be directed toward oncoming traffic in this position but only in the direction of closely adjacent cars to the right of the signalling vehicle. If desired, a suitable shield can be provided to occult the beam in this continuous position at the fully rotated position created by continuous energization of the solenoid 18.

When the switch 101 is released the solenoid 18 is deenergized and the spring return for the reflector 51 (not shown in FIG. 4) returns the reflector 51 to the position where it opens contacts 102 and deenergizes the lamp 62. Thus the normal operating sequence for the circuit of FIG. 4 would be a timed closure of switch 101 and a release as soon as the reflector 51 is rotated to its full clockwise position so that a continuous sweep from left to right and back again from right to left is obtained by appropriate timed operation of the switch 101. Switch 101 is preferably a spring return momentary contact type. With a little practice the operator is able to achieve an operation which is similar to the fully automatic system described in FIG. 3.

It should be noted that since the lamp 62 is only used intermittently, an overvoltage may be used to obtain high brilliance. In any event it may be desirable to reduce the intensity of the light from lamp 62 for nighttime driving conditions. With this expedient an extremely brilliant lamp for daytime detection can be utilized while not having objectionable brightness under conditions of darkness. For this purpose a lamp dimming circuit is shown in FIG. 4 (which can be readily adapted to any other circuit for which the device is used such as the circuit of FIG. 3) whereby an additional resistor 103 is placed in series with the filament of the lamp 62 whenever contacts 104 are opened. Contacts 104 are controlled by a relay 105. The relay 105 is energized by means of the headlamp switch 106 of the automobile as it normally energizes the headlights of the automobile which are connected to lead 107. In this manner whenever the automobile is being driven with its headlights energized the relay 105 will also be energized and contacts 104 will be open to add the resistor 103 in series with the filament of lamp 62 causing it to dim to an appropriate level for nighttime operation.

Many modifications of the present invention will occur to those skilled in the art. For example other types of actuators to produce the rotation of the reflector 51 can be utilized and other mounting means for the entire assembly against the windshield 12 can be used. The circuit characteristics disclosed give a two sweep movement during which the lamp 62 is energized and for any azimuth position ahead of the automobile a double flash will be received with the time between the flashes being somewhat determined by azimuth location. Thus for an azimuth location at one extreme of the rotation a relatively long single flash will be perceived while for an azimuth location at the other extreme two distinct flashes spaced by the maximum time interval of the full back and forth swing will be seen. Intermediate azimuth positions will see a double flash with the separation between the flashes being of gradually changing duration depending upon the azimuth angle. In no event is a blinding continuous flash received and thus high intensity beams can be utilized and reasonable economies of equipment can be achieved since the highly concentrating reflectors 41 and 51 provide high intensities with a relatively inexpensive light source such as a lamp 62. Thus the objectives of covering a relatively wide angle with an extremely high intensity beam and yet making the effective duration of the flash so short as not to produce blinding effects is achieved and selectively available to the driver of the automobile as a transient signal whenever the need arises. If desired, a characteristic color such as amber can be used for the signal by means of a suitably colored filter or lamp.

I claim:

1. A transient warning light signalling device for an automobile comprising a normally deenergized light source; a reflector for concentrating light from said source to produce a narrow beam; means for mounting said device on an automobile in a position to project said beam substantially horizontally ahead of said automobile; switch means selectively operable by the driver of said automobile; electric circuit means responsive to operation of said switch means for initiating a transient cycle that automatically terminates prior to initiation of a subsequent cycle; said electric circuit means including means for energizing said light source, actuator means for rotating said narrow beam through a limited substantially horizontal angle while said light source is energized, and means for deenergizing said light source after said rotating; thereby to scan the traffic area ahead of said automobile with a transient scanning light beam that appears as a brief flash at the individual azimuth angles within said horizontal angle.

2. Apparatus according to claim 1 in which said reflector is a paraboloid and said light source is an incandescent lamp located at the focus thereof and said reflector is rotatable by said actuator means from a normal at rest position angularly displaced to one side of the forward direction of said automobile to another position angularly displaced on the other side of said forward direction, said circuit means for energizing said lamp being responsive to displacement of said reflector to energize said lamp when said reflector is angularly displaced from said at rest position.

3. Apparatus according to claim 2 and including a stationary extension of said paraboloid mounted with the parabolic axis of said extension in said forward direction and aligned with the parabolic axis of said reflector when said reflector is rotated to direct said beam in said forward direction to increase the parabolic aperture of said beam.

4. A light signalling device for an automobile comprising a light source, means selectively operable by the driver of an automobile for initiating a transient cycle that automatically terminates, a parabolic reflector for said light source to concentrate light from said source into a narrow beam along the parabolic axis, the aperture of said parabolic reflector being asymmetrically truncated substantially to fit the inner surface of a sloping windshield when said parabolic axis is horizontal, means for mounting said parabolic reflector with said aperture in light tight contact with the sloping inner surface of a windshield and with said axis directed substantially horizontally to project said beam through said windshield and electric circuit means responsive to said selectively operable means for scanning said narrow beam through a limited azimuth angle and energizing said light source, said scanning and said energizing terminating at the end of said transient cycle.

References Cited

UNITED STATES PATENTS

| | | | |
|---|---|---|---|
| 1,197,237 | 9/1916 | Sherlock | 240—44 |
| 1,879,057 | 9/1932 | Bray | 340—97 |
| 2,084,252 | 6/1937 | Hallenberg | 340—97 |
| 2,133,106 | 10/1938 | Monroe | 240—48 |
| 2,268,476 | 12/1941 | Duncan | 240—48 X |

EUGENE G. BOTZ, *Primary Examiner.*

U.S. Cl. X.R.

240—44; 340—97